United States Patent
Gopalraju et al.

(10) Patent No.: US 9,411,353 B2
(45) Date of Patent: Aug. 9, 2016

(54) METHOD AND CIRCUITRY FOR REGULATING A VOLTAGE

(71) Applicant: Texas Instruments Incorporated, Dallas, TX (US)

(72) Inventors: Seenu Gopalraju, San Jose, CA (US); Patrick Michael Teterud, Plano, TX (US); Shanmuganand Chellamuthu, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 173 days.

(21) Appl. No.: 14/194,103

(22) Filed: Feb. 28, 2014

(65) Prior Publication Data

US 2015/0248137 A1    Sep. 3, 2015

(51) Int. Cl.
| | | |
|---|---|---|
| G06F 1/00 | (2006.01) | |
| G11C 7/06 | (2006.01) | |
| G05F 1/00 | (2006.01) | |
| G05F 3/02 | (2006.01) | |
| G06F 1/26 | (2006.01) | |
| G05F 3/30 | (2006.01) | |

(52) U.S. Cl.
CPC .. G05F 3/02 (2013.01); G05F 3/30 (2013.01); G06F 1/26 (2013.01)

(58) Field of Classification Search
CPC ..................................................... G06F 1/3203
USPC ......................................................... 713/300
See application file for complete search history.

(56) References Cited

U.S. PATENT DOCUMENTS

| | | | |
|---|---|---|---|
| 6,753,722 B1 * | 6/2004 | Kondapalli et al. | 327/540 |
| 7,170,272 B2 * | 1/2007 | Yoshida | 323/284 |
| 8,929,157 B2 * | 1/2015 | Mozak et al. | 365/189.07 |
| 2003/0043640 A1 | 3/2003 | Marr et al. | |
| 2009/0080276 A1 | 3/2009 | Cai et al. | |
| 2010/0060083 A1 * | 3/2010 | Rolland | 307/80 |
| 2012/0001603 A1 * | 1/2012 | Ouyang et al. | 323/271 |
| 2014/0032942 A1 * | 1/2014 | Takehara et al. | 713/300 |

FOREIGN PATENT DOCUMENTS

| | | |
|---|---|---|
| WO | WO0247244 A1 | 6/2002 |
| WO | WO2013101718 A1 | 7/2013 |

OTHER PUBLICATIONS

International Search Report and Written Opinion for PCT/US2014/058078 mailed Mar. 26, 2015.

* cited by examiner

*Primary Examiner* — Suresh Suryawanshi
(74) *Attorney, Agent, or Firm* — Michael A. Davis, Jr.; Frank D. Cimino

(57) ABSTRACT

In response to a first reference voltage, a regulator regulates an output voltage of a line, so that the output voltage is approximately equal to a target voltage. In response to the output voltage rising above a second reference voltage, pull down circuitry draws current from the line. In response to the output voltage falling below the second reference voltage by at least a predetermined amount, the pull down circuitry ceases to draw current from the line. The first and second reference voltages are based upon a same band gap reference as one another.

24 Claims, 3 Drawing Sheets

METHOD AND CIRCUITRY FOR REGULATING A VOLTAGE

BACKGROUND

The disclosures herein relate in general to electronic circuitry, and in particular to a method and circuitry for regulating a voltage.

A regulator can output a regulated supply voltage to a processor (e.g., one or more microprocessors, microcontrollers and/or digital signal processors). In one example, the regulator is specified to output the regulated supply voltage at 1.2 volts ("target voltage"). However, if an undershoot condition occurs (e.g., in which the regulated supply voltage is at least 36 millivolts below the target voltage), then the processor may automatically reset.

By comparison, the processor may tolerate an overshoot condition (e.g., in which the regulated supply voltage is more than a predetermined level above the target voltage), so long as the overshoot condition has a relatively short duration (e.g., measured in milliseconds). Nevertheless, if the processor has a step down (e.g., 500 mA in 1 μs) of load current, then it may cause the overshoot condition followed by the undershoot condition. To reduce the overshoot condition, one conventional technique uses a state machine to control a pull down (of the regulated supply voltage) for a predetermined constant duration, but the predetermined constant duration may be unsuitable if variation occurs in one or more environmental (e.g., process, voltage and/or temperature) conditions.

SUMMARY

In response to a first reference voltage, a regulator regulates an output voltage of a line, so that the output voltage is approximately equal to a target voltage. In response to the output voltage rising above a second reference voltage, pull down circuitry draws current from the line. In response to the output voltage falling below the second reference voltage by at least a predetermined amount, the pull down circuitry ceases to draw current from the line. The first and second reference voltages are based upon a same band gap reference as one another.

DETAILED DESCRIPTION

Figure 1:
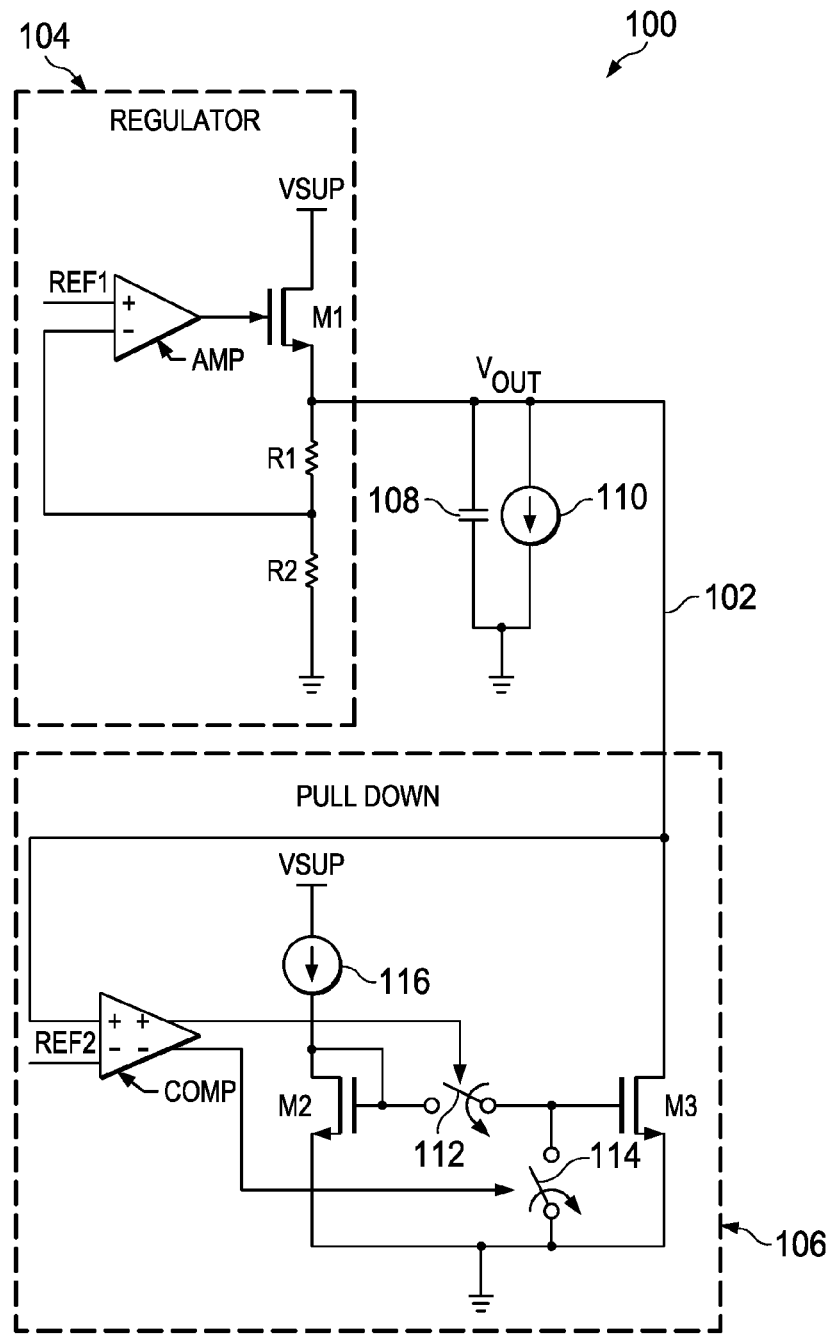
FIG. 1 is a schematic electrical circuit diagram of circuitry for regulating a voltage.

FIG. 1 is a schematic electrical circuit diagram of circuitry, indicated generally at 100, for regulating a voltage $V_{OUT}$ of an output line 102. The circuitry 100 includes: (a) a regulator, indicated by dashed enclosure 104, for regulating $V_{OUT}$; and (b) pull down circuitry, indicated by dashed enclosure 106, for adaptively drawing current from the line 102. In one embodiment: (a) the circuitry 106 is formed within a same integrated circuit as the regulator 104; and (b) the regulator 104 and the circuitry 106 are comparably affected by variation in one or more environmental conditions, such as process, voltage and/or temperature ("PVT") variations.

In the regulator 104, an amplifier AMP has an output node and first and second input nodes. The output node is connected to a gate of an n-channel field-effect transistor ("NFET"), namely M1. The first input node is connected to a reference voltage REF1=α·BG, where α is a constant, and BG is a band gap. The second input node is connected between first and second resistors whose resistances are R1 and R2 respectively.

A drain of M1 is connected to a voltage supply node VSUP. A source of M1 is coupled to a ground through the first and second resistors (having resistances R1 and R2) in series, as shown in FIG. 1. Also, the line 102 is connected to the second source/drain of M1. M1 operates as a power output stage. M1 is relatively large, which: (a) lowers a resistance (and, similarly, lowers a voltage drop) between M1's drain and source; (b) increases M1's capacity for conducting current (e.g., 1 amp); and (c) improves M1's transient response. Accordingly, M1's gate-to-source capacitance ("Cgs") and gate-to-drain capacitance ("Cgd") are relatively large.

In this example, the regulator 104 is specified to output $V_{OUT}$=1.2 volts ("target voltage"), as a regulated supply voltage to a processor. Such processor's capacitance load and current load (e.g., ~500 mA) are represented in FIG. 1 by a capacitor 108 and a current source 110, which are coupled between the line 102 and the ground. In response to REF1, AMP operates to regulate $V_{OUT} \approx REF1 \cdot (R1+R2)/R2$, so that REF1·(R1+R2)/R2 is the target voltage. For such operation, a voltage level of VSUP is greater than $V_{OUT}$ by at least a dropout voltage. Accordingly, the dropout voltage is a difference between: (a) a minimum voltage level of VSUP for such operation; and (b) $V_{OUT}$.

In the circuitry 106, a comparator COMP has first and second output nodes and first and second input nodes. The first output node is connected to operate a switch 112. The second output node is connected to operate a switch 114. The first input node is connected to the line 102. The second input node is connected to a comparison voltage REF2=$[\Delta L_{OV}]$+REF1·(R1+R2)/R2, where $\Delta L_{OV}$ is a predetermined level for detecting an overshoot condition, so that COMP detects the overshoot condition in response to $V_{OUT}$ exceeding REF1·(R1+R2)/R2 by at least $\Delta L_{OV}$. In the illustrative embodiments, REF2 is near (yet below) the permitted maximum level of $V_{OUT}$ from the regulator 104.

VSUP is coupled through a current source 116 to a drain of an NFET, namely M2. The drain of M2 is connected to a gate of M2. A source of M2 is connected to the ground. The line 102 is connected to a drain of an NFET, namely M3. A source of M3 is connected to the ground.

The gate of M3 is selectively: (a) connected to, and disconnected from, the gate of M2 by the switch 112; and (b) connected to, and disconnected from, the ground by the switch 114. For example, in response to $V_{OUT}$ rising above REF2 ($V_{OUT}$>REF2): (a) a binary logic state of COMP's first output node ("+")=1, which closes the switch 112 to connect the gate of M3 to the gate of M2; (b) a binary logic state of COMP's second output node ("−")=0, which opens the switch 114 to disconnect the gate of M3 gate from the ground; and (c) accordingly, M3 turns on and operates as a current mirror of M2, which conducts a substantially constant amount of current from the current source 116.

In that manner, M3 operates as a pull down transistor for selectively drawing the pull down current from the line 102. In this example, while M3 is turned on, it rapidly pulls down ~120 mA of current from the line 102.

Conversely, in response to $V_{OUT}$ falling below REF2-$H_{VAL}$ ($V_{OUT} \leq$ REF2-$H_{VAL}$, where $H_{VAL}$ is a predetermined hysteresis amount, which reduces sensitivity to transient glitches from higher bond inductances): (a) a binary logic state of COMP's first output node ("+")=0, which opens the switch 112 to disconnect the gate of M3 from the gate of M2; (b) a binary logic state of COMP's second output node ("−")=1, which closes the switch 114 to connect the gate of M3 gate to the ground; and (c) accordingly, M3 turns off, so that M3 ceases to draw the pull down current from the line 102.

In response to a larger overshoot condition, M3 remains turned on for a longer period of time. By comparison, in response to a smaller overshoot condition, M3 remains turns on for a shorter period of time. In that manner, the circuitry 106 is adaptive to the overshoot condition and controls M3's turn on time accordingly, which helps to reduce likelihood of an undershoot condition following the overshoot condition (e.g., in response to a step down of load current from 515 mA to 15 mA in 1 µs on the line 102).

For example, in controlling a start and duration of M3's turn on time, the circuitry 106 is not dependent on a conventional state machine technique. Instead, during normal operation of the regulator 104, the circuitry 106 controls the start and duration of M3's turn on time in response to COMP's comparison between REF2 and $V_{OUT}$. REF1 and REF2 are based upon a same BG reference as one another. Accordingly, the regulator 104 and the circuitry 106 are comparably affected by variation in one or more environmental conditions, so the circuitry 106 automatically and suitably adapts the start and duration of M3's turn on time. Such technique helps to: (a) achieve faster settling at the gate of M1; and (b) reduce likelihood of the undershoot condition following the overshoot condition.

Moreover, by automatically and suitably adapting the start and duration of M3's turn on time, the circuitry 106 substantially avoids disruption of the regulator 104's loop control. For example, while $V_{OUT}$ rises, M1's Cgs injects transient current into the gate of M1, which affects settling at the gate of M1. While M3 is turned on, it discharges such transient current. Conversely, while M3 is turned off, it stops discharging such transient current.

Figure 2:
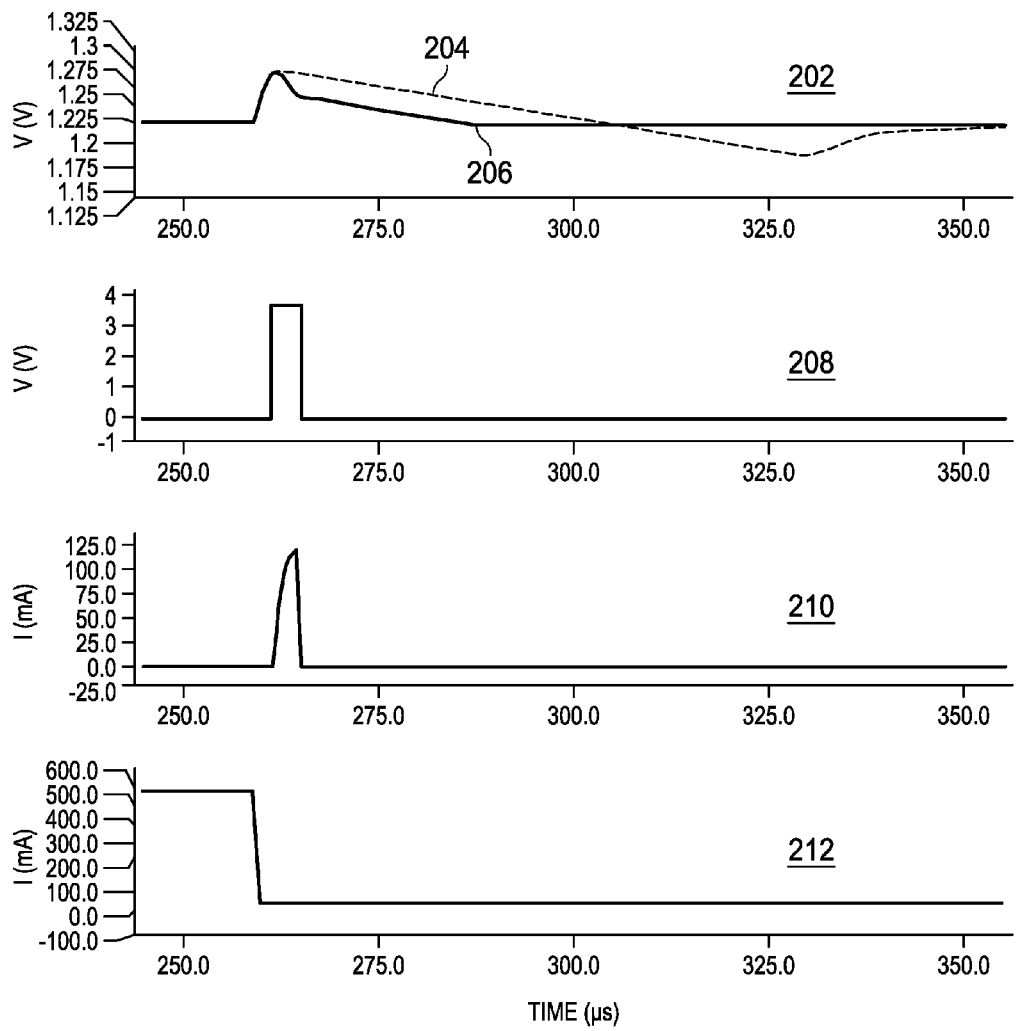
FIG. 2 is a first set of graphs for showing an operation of the circuitry of FIG. 1, in comparison to a conventional state machine technique.

FIG. 2 is a first set of graphs for showing an operation of the circuitry 100, in comparison to a conventional state machine technique. In FIG. 2, a first graph 202 shows: (a) a trace 204 of $V_{OUT}$ without the circuitry 106; and (b) a trace 206 of $V_{OUT}$ with the circuitry 106. A second graph 208 shows a trace of COMP's first output node ("+"). A third graph 210 shows a trace of pull down current through M3. A fourth graph 212 shows a step down of load current (e.g., of the current source 110) from 515 mA to 15 mA in 1 µs on the line 102.

Figure 3:
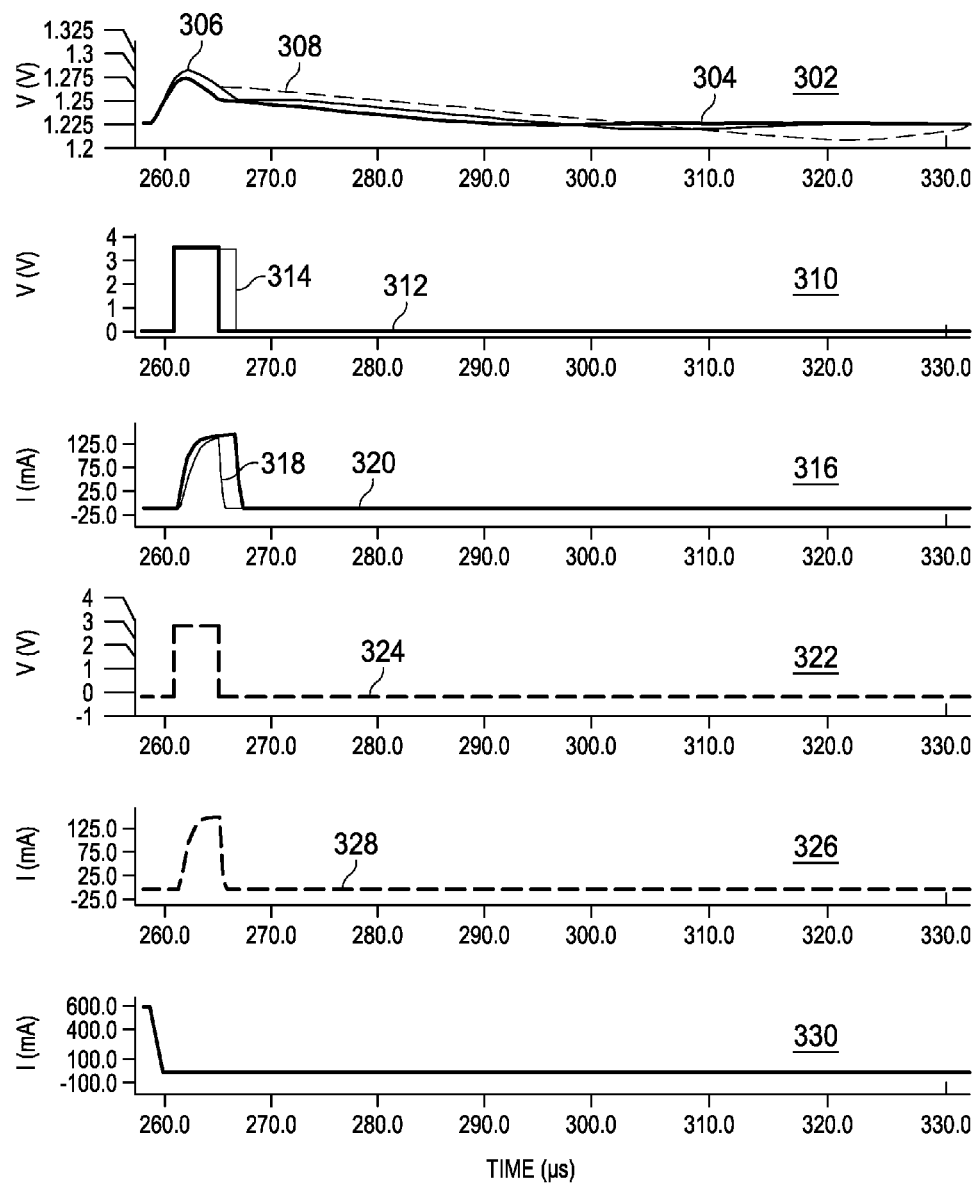
FIG. 3 is a second set of graphs for showing an operation of the circuitry of FIG. 1 at different temperatures, in comparison to a conventional state machine technique at different temperatures.

FIG. 3 is a second set of graphs for showing an operation of the circuitry 100 at different temperatures, in comparison to a conventional state machine technique at different temperatures. In FIG. 3, a first graph 302 shows: (a) a trace 304 of $V_{OUT}$ while operating at 27° C. with the circuitry 106; (b) a trace 306 of $V_{OUT}$ while operating at 180° C. with the circuitry 106; and (c) a trace 308 of $V_{OUT}$ while operating at 180° C. without the circuitry 106. A second graph 310 shows: (a) a trace 312 of COMP's first output node ("+") while operating at 27° C.; and (b) a trace 314 of COMP's first output node ("+") while operating at 180° C. A third graph 316 shows: (a) a trace 318 of pull down current through M3 while operating at 27° C.; and (b) a trace 320 of pull down current through M3 while operating at 180° C.

Also, in FIG. 3, a fourth graph 322 shows a trace 324 of a conventional state machine technique's pull down control signal while operating at 180° C., which is approximately the same as while operating at 27° C. The trace 324 has a predetermined constant duration, but the predetermined constant duration may be unsuitable if variation occurs in one or more environmental conditions. A fifth graph 326 shows a trace 328 of a conventional state machine technique's pull down current while operating at 180° C. A sixth graph 330 shows a step down of load current from 515 mA to 15 mA in 1 µs on the line 102.

In the particular example of FIG. 3, while operating at 27° C., the trace 312 is approximately the same as the trace 324. By comparison, while operating at 180° C., the trace 314 is significantly different from the trace 324. Accordingly, the conventional state machine technique's pull down control signal (as shown by the trace 324 having the predetermined constant duration) potentially increases: (a) settling time under one or more environmental conditions; and (b) likelihood of the undershoot condition following the overshoot condition.

Although illustrative embodiments have been shown and described by way of example, a wide range of alternative embodiments is possible within the scope of the foregoing disclosure.

What is claimed is:

1. Circuitry for regulating a voltage, the circuitry comprising:
a regulator including an amplifier and a first transistor, the amplifier having an output node and first and second input nodes, the amplifier's output node being connected to a gate of the first transistor, the amplifier's first input node being connected to a first reference voltage, a source of the first transistor being coupled to a ground through first and second resistors in series, the source of the first transistor being connected to a line, and the amplifier's second input node being connected between the first and second resistors, wherein the regulator is to regulate an output voltage of the line in response to the first reference voltage, so that the output voltage is approximately equal to a target voltage; and
pull down circuitry including a comparator and second and third transistors, the comparator having an output node and first and second input nodes, the comparator's output node being connected to operate a switch, the comparator's first input node being connected to the line, the comparator's second input node being connected to a second reference voltage, a drain of the third transistor being connected to the line and the second transistor being connected to conduct a substantially constant amount of current from a current source, wherein the pull down circuitry is to: in response to the output voltage rising above the second reference voltage, draw current from the line by the comparator operating the switch to connect a gate of the third transistor to a gate of the second transistor; and, in response to the output voltage falling below the second reference voltage by at least a predetermined amount, cease drawing the current from the line by the comparator operating the switch to turn off the third transistor, wherein the first and second reference voltages are based upon a same band gap reference as one another.

2. The circuitry of claim 1, wherein the regulator and the pull down circuitry are comparably affected by variation in one or more environmental conditions.

3. The circuitry of claim 1, wherein the environmental conditions include at least one of process, voltage and temperature.

4. The circuitry of claim 3, wherein the environmental conditions include at least two of process, voltage and temperature.

5. The circuitry of claim 1, wherein the output voltage is a supply voltage to a processor.

6. The circuitry of claim 1, wherein the second reference voltage equals the target voltage plus $\Delta L_{OV}$, wherein $\Delta L_{OV}$ is a predetermined level for detecting an overshoot condition.

7. The circuitry of claim 1, wherein the second reference voltage is below a permitted maximum level of the output voltage.

8. The circuitry of claim 1, wherein the regulator includes first and second resistors whose resistances are R1 and R2 respectively, wherein the line is coupled to a ground through the first and second resistors in series, and wherein the target voltage equals the first reference voltage multiplied by (R1+R2)/R2.

9. The circuitry of claim 1, wherein the pull down circuitry includes a comparator for: comparing the output voltage to the second reference voltage; and outputting at least one signal in response to the comparing.

10. The circuitry of claim 1, wherein drawing current includes: drawing a substantially constant amount of current.

11. A method of regulating a voltage, the method comprising:
with a regulator that includes an amplifier and a first transistor, the amplifier having an output node and first and second input nodes, the amplifier's output node being connected to a gate of the first transistor, the amplifier's first input node being connected to a first reference voltage, a source of the first transistor being coupled to a ground through first and second resistors in series, the source of the first transistor being connected to a line, and the amplifier's second input node being connected between the first and second resistors, regulating an output voltage of the line in response to the first reference voltage, so that the output voltage is approximately equal to a target voltage; and
with pull down circuitry that includes a comparator and second and third transistors, the comparator having an output node and first and second input nodes, the comparator's output node being connected to operate a switch, the comparator's first input node being connected to the line, the comparator's second input node being connected to a second reference voltage, a drain of the third transistor being connected to the line and the second transistor being connected to conduct a substantially constant amount of current from a current source: in response to the output voltage rising above the second reference voltage, drawing current from the line by the comparator operating the switch to connect a gate of the third transistor to a gate of the second transistor; and, in response to the output voltage falling below the second reference voltage by at least a predetermined amount, ceasing to draw the current from the line by the comparator operating the switch to turn off the third transistor, wherein the first and second reference voltages are based upon a same band gap reference as one another.

12. The method of claim 11, wherein the regulator and the pull down circuitry are comparably affected by variation in one or more environmental conditions.

13. The method of claim 11, wherein the environmental conditions include at least one of process, voltage and temperature.

14. The method of claim 13, wherein the environmental conditions include at least two of process, voltage and temperature.

15. The method of claim 11, wherein the output voltage is a supply voltage to a processor.

16. The method of claim 11, wherein the second reference voltage equals the target voltage plus $\Delta L_{OV}$, wherein $\Delta L_{OV}$ is a predetermined level for detecting an overshoot condition.

17. The method of claim 11, wherein the second reference voltage is below a permitted maximum level of the output voltage.

18. The method of claim 11, wherein the regulator includes first and second resistors whose resistances are R1 and R2 respectively, wherein the line is coupled to a ground through the first and second resistors in series, and wherein the target voltage equals the first reference voltage multiplied by (R1+R2)/R2.

19. The method of claim 11, wherein the pull down circuitry includes a comparator, and including:
with the comparator: comparing the output voltage to the second reference voltage; and outputting at least one signal in response to the comparing.

20. The method of claim 11, wherein drawing current includes: drawing a substantially constant amount of current.

21. Circuitry for regulating a voltage, the circuitry comprising:
a regulator including an amplifier and a first transistor, the amplifier having an output node and first and second input nodes, the amplifier's output node being connected to a gate of the first transistor, the amplifier's first input node being connected to a first reference voltage, a source of the first transistor being coupled to a ground through first and second resistors in series, the source of the first transistor being connected to a line, and the amplifier's second input node being connected between the first and second resistors, wherein the regulator is to regulate an output voltage of the line in response to the first reference voltage, so that the output voltage is approximately equal to a target voltage; and
pull down circuitry including a comparator and second and third transistors, the comparator having an output node and first and second input nodes, the comparator's output node being connected to operate a switch, the comparator's first input node being connected to the line, the comparator's second input node being connected to a second reference voltage, a drain of the third transistor being connected to the line, and the second transistor being connected to conduct a substantially constant amount of current from a current source, wherein the pull down circuitry is to: in response to the output voltage rising above the second reference voltage, draw the substantially constant amount of current from the line by the comparator operating the switch to connect a gate of the third transistor to a gate of the second transistor; and, in response to the output voltage falling below the second reference voltage by at least a predetermined amount, cease drawing the current from the line by the comparator operating the switch to turn off the third transistor, wherein the second reference voltage equals the target voltage plus $\Delta L_{OV}$, wherein $\Delta L_{OV}$ is a predetermined level for detecting an overshoot condition, and wherein the second reference voltage is below a permitted maximum level of the output voltage;
wherein the first and second reference voltages are based upon a same band gap reference as one another, the regulator and the pull down circuitry are comparably affected by variation in one or more environmental conditions, and the environmental conditions include at least one of: process, voltage and temperature.

22. The circuitry of claim 21, wherein the output voltage is a supply voltage to a processor.

23. The circuitry of claim 21, wherein the regulator includes first and second resistors whose resistances are R1 and R2 respectively, wherein the line is coupled to a ground through the first and second resistors in series, and wherein the target voltage equals the first reference voltage multiplied by (R1+R2)/R2.

24. The circuitry of claim 21, wherein the pull down circuitry includes a comparator for: comparing the output voltage to the second reference voltage; and outputting at least one signal in response to the comparing.

\* \* \* \* \*